US012755484B2

(12) United States Patent
Noguchi

(10) Patent No.: US 12,755,484 B2
(45) Date of Patent: Oct. 6, 2026

(54) THREE-DIMENSIONAL MODEL GENERATION DEVICE, THREE-DIMENSIONAL MODEL GENERATION METHOD, AND NON-TRANSITORY STORAGE MEDIUM TO DETECT AN OPTICAL SURFACE REGION IN MULTIPLE CAPTURED IMAGES

(71) Applicant: JVCKENWOOD Corporation, Yokohama (JP)

(72) Inventor: Hiroshi Noguchi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 179 days.

(21) Appl. No.: 18/739,360

(22) Filed: Jun. 11, 2024

(65) Prior Publication Data

US 2024/0331286 A1 Oct. 3, 2024

Related U.S. Application Data

(63) Continuation of application No. PCT/JP2022/046110, filed on Dec. 14, 2022.

(30) Foreign Application Priority Data

Dec. 14, 2021 (JP) ................................ 2021-202690

(51) Int. Cl.
*G06T 17/00* (2006.01)
*G06T 7/73* (2017.01)
(Continued)

(52) U.S. Cl.
CPC ................ *G06T 17/00* (2013.01); *G06T 7/73* (2017.01); *G06T 7/90* (2017.01); *G06T 19/20* (2013.01);
(Continued)

(58) Field of Classification Search
CPC .. G06T 17/00; G06T 7/73; G06T 7/90; G06T 19/20; G06T 2207/10024;
(Continued)

(56) References Cited

U.S. PATENT DOCUMENTS 10,453,262 B1 * 10/2019 Falstrup ................ G06T 19/006
10,937,247 B1 * 3/2021 Chuah ....................... G06T 7/70
(Continued)

FOREIGN PATENT DOCUMENTS

CN 111339917 A * 6/2020 ........... G06F 18/253
JP 2004-110459 4/2004
(Continued)

OTHER PUBLICATIONS

Whelan et. al., "Reconstructing Scenes with Mirror and Glass Surfaces", ACM Trans. Graph. 37, 4, Article 102 (Aug. 2018), 11 pages. https://doi.org/10.1145/3197517.3201319 (Year: 2018).*
(Continued)

*Primary Examiner* — Maurice L. Mcdowell, Jr.
(74) *Attorney, Agent, or Firm* — Amin, Turocy & Watson, LLP

(57) ABSTRACT

A three-dimensional model generation device includes: an imager configured to acquire multiple images captured at multiple capturing positions; an optical surface detection unit configured to detect an optical surface region in which at least one of a reflected image visually recognized by reflection of light and a transmitted visual object visually recognized through a transparent member is observed in the multiple captured images; a model generation unit configured to arrange a mask in the optical surface region and generates a three-dimensional model based on the multiple images in which the mask is arranged; and a color attribute detection unit configured to detect a color attribute of the optical surface region, wherein the model generation unit is further configured to generate and arrange the mask based on the color attribute of the optical surface region and a type of the optical surface region.

6 Claims, 7 Drawing Sheets

(51) Int. Cl.
*G06T 7/90* (2017.01)
*G06T 19/20* (2011.01)

(52) U.S. Cl.
CPC ............... *G06T 2207/10024* (2013.01); *G06T 2219/2012* (2013.01)

(58) Field of Classification Search
CPC ... G06T 2219/2012; G06T 2207/10012; G06T 7/593
See application file for complete search history.

(56) References Cited

U.S. PATENT DOCUMENTS

| | | | | |
|---|---|---|---|---|
| 2006/0181535 | A1 | 8/2006 | Watt | |
| 2017/0352275 | A1 | 12/2017 | Maruyama et al. | |
| 2024/0296621 | A1 * | 9/2024 | Teranishi | G06T 7/593 |

FOREIGN PATENT DOCUMENTS

| | | |
|---|---|---|
| JP | 2005-346348 | 12/2005 |
| JP | 2006-025061 | 1/2006 |
| JP | 2006-528381 | 12/2006 |
| JP | 2017-220923 | 12/2017 |

OTHER PUBLICATIONS

Torres-Gomez et. al., "Recognition and Reconstruction of Transparent Objects for Augmented Reality", IEEE International Symposium on Mixed and Augmented Reality 2014 Science and Technology Proceedings Sep. 10-12, 2014, Munich, Germany 978-1-4799-6184-9/13/$31.00 © 2014 IEEE (Year: 2014).*

Yang et. al., "Where is My Mirror?", In Proceedings of the IEEE/CVF International Conference on Computer Vision (pp. 8809-8818) 2019, (Year: 2019).*

Lin et. al., "Progressive Mirror Detection", Proceedings of the IEEE/CVF Conference on Computer Vision and Pattern Recognition (CVPR), 2020, pp. 3697-3705, (Year: 2020).*

International Search Report and Written Opinion for International Application Serial No. PCT/JP2022/046110 mailed on Jan. 24, 2023, 9 pages.

* cited by examiner

THREE-DIMENSIONAL MODEL GENERATION DEVICE, THREE-DIMENSIONAL MODEL GENERATION METHOD, AND NON-TRANSITORY STORAGE MEDIUM TO DETECT AN OPTICAL SURFACE REGION IN MULTIPLE CAPTURED IMAGES

CROSS-REFERENCE TO RELATED APPLICATIONS

This application is a Continuation of PCT International Application No. PCT/JP2022/046110 filed on Dec. 14, 2022 which claims the benefit of priority from Japanese Patent Application No. 2021-202690 filed on Dec. 14, 2021, the entire contents of both of which are incorporated herein by reference.

FIELD OF THE INVENTION

The present application relates to a three-dimensional model generation device, a three-dimensional model generation method, and a non-transitory storage medium.

BACKGROUND OF THE INVENTION

There is known a technique called photogrammetry in which multiple images are captured while a capturing position is changed with respect to a subject, and a three-dimensional model is generated based on multiple pieces of image data (See, for example, Japanese Unexamined Patent Application Publication 2006-528381).

In a case where a reflective surface such as a mirror surface or an optical surface reflecting a surrounding image such as a transmissive surface like a window is provided in a subject, there is a case where a three-dimensional model is generated as if a space also exists behind the optical surface or a three-dimensional model in which a portion corresponding to the optical surface is broken is generated. As described above, in the photogrammetry, it is required to generate a three-dimensional model by appropriately processing an optical surface included in an image.

A three-dimensional model generation device, a three-dimensional model generation method, and a non-transitory storage medium are disclosed.

SUMMARY OF THE INVENTION

According to one aspect of the present application, there is provided a three-dimensional model generation device comprising: an imager configured to acquire multiple images captured at multiple capturing positions; an optical surface detection unit configured to detect an optical surface region in which at least one of a reflected image visually recognized by reflection of light and a transmitted visual object visually recognized through a transparent member is observed in the multiple captured images; a model generation unit configured to arrange a mask in the optical surface region and generate a three-dimensional model based on the multiple images in which the mask is arranged; and a color attribute detection unit configured to detect a color attribute of the optical surface region, wherein the model generation unit is further configured to: generate, in a case in which the color attribute of the optical surface region has a predetermined tendency, the mask having a color attribute corresponding to the color attribute of the optical surface region and arrange the generated mask; arrange, in a case in which the color attribute of the optical surface region does not have a predetermined tendency and the optical surface region is a reflective surface region in which a reflected image visually recognized by reflection of light is observed, the mask corresponding to the reflective surface region; and arrange, in a case in which the color attribute of the optical surface region does not have a predetermined tendency and the optical surface region is a transmissive surface region in which a transmitted visual object visually recognized through a transparent member is observed, the mask corresponding to the transmissive surface region.

According to one aspect of the present application, there is provided a three-dimensional model generation method comprising: acquiring multiple images captured at multiple capturing positions; detecting an optical surface region in which at least one of a reflected image visually recognized by reflection of light and a transmitted visual object visually recognized through a transparent member is observed in the multiple captured images; arranging a mask in the optical surface region and generating a three-dimensional model based on the multiple images in which the mask is arranged; and detecting a color attribute of the optical surface region, wherein at the arranging and the generating, generating, in a case in which the color attribute of the optical surface region has a predetermined tendency, the mask having a color attribute corresponding to the color attribute of the optical surface region and arranging the generated mask; arranging, in a case in which the color attribute of the optical surface region does not have a predetermined tendency and the optical surface region is a reflective surface region in which a reflected image visually recognized by reflection of light is observed, the mask corresponding to the reflective surface region; and arranging, in a case in which the color attribute of the optical surface region does not have a predetermined tendency and the optical surface region is a transmissive surface region in which a transmitted visual object visually recognized through a transparent member is observed, the mask corresponding to the transmissive surface region.

According to one aspect of the present application, there is provided a non-transitory storage medium that stores a three-dimensional model generation program causing a computer to execute a process comprising: acquiring multiple images captured at multiple capturing positions; detecting an optical surface region in which at least one of a reflected image visually recognized by reflection of light and a transmitted visual object visually recognized through a transparent member is observed in the multiple captured images; arranging a mask in the optical surface region and generating a three-dimensional model based on the multiple images in which the mask is arranged; and detecting a color attribute of the optical surface region, wherein at the arranging and the generating, generating, in a case in which the color attribute of the optical surface region has a predetermined tendency, the mask having a color attribute corresponding to the color attribute of the optical surface region and arranging the generated mask; arranging, in a case in which the color attribute of the optical surface region does not have a predetermined tendency and the optical surface region is a reflective surface region in which a reflected image visually recognized by reflection of light is observed, the mask corresponding to the reflective surface region; and arranging, in a case in which the color attribute of the optical surface region does not have a predetermined tendency and the optical surface region is a transmissive surface region in which a transmitted visual object visually recognized through a transparent member is observed, the mask corresponding to the transmissive surface region.

The above and other objects, features, advantages and technical and industrial significance of this application will be better understood by reading the following detailed description of presently preferred embodiments of the invention, when considered in connection with the accompanying drawings.

DETAILED DESCRIPTION OF THE INVENTION

Hereinafter, embodiments of a three-dimensional model generation device, a three-dimensional model generation method, and non-transitory storage medium that stores a three-dimensional model generation program according to the present application will be described with reference to the drawings. Note that the present application is not limited by the embodiments. In addition, constituent elements in the following embodiments include those that can be easily replaced by those skilled in the art or those that are substantially the same.

Figure 1:
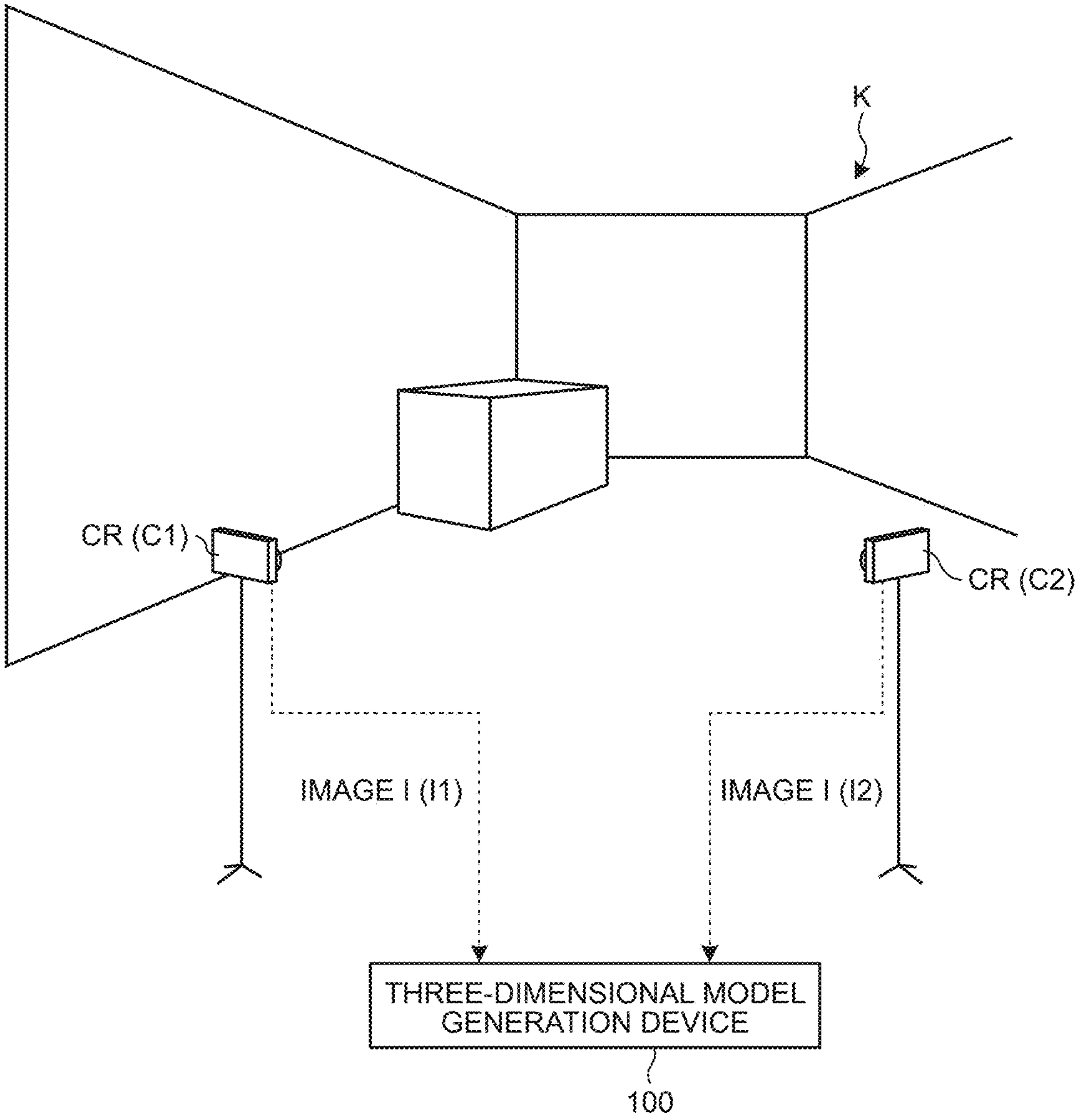
FIG. 1 is a diagram schematically illustrating an example of a three-dimensional model generation device according to the present embodiment.
Figure 2:
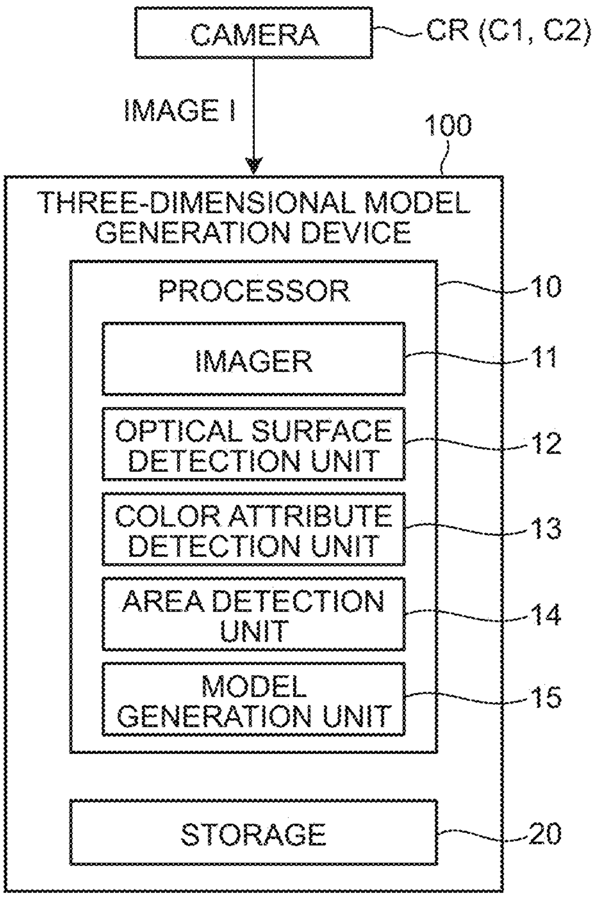
FIG. 2 is a functional block diagram illustrating an example of a three-dimensional model generation device.

FIG. 1 is a diagram schematically illustrating an example of a three-dimensional model generation device 100 according to the present embodiment. FIG. 2 is a functional block diagram illustrating an example of the three-dimensional model generation device 100. The three-dimensional model generation device 100 illustrated in FIGS. 1 and 2 generates a three-dimensional model based on a principle of photogrammetry. As illustrated in FIGS. 1 and 2, the three-dimensional model generation device 100 includes a processor 10 and a storage 20.

The processor 10 includes a processing device such as a central processor (CPU) and a storage device such as a random access memory (RAM) or a read only memory (ROM). The processor 10 includes an imager 11, an optical surface detection unit 12, a color attribute detection unit 13, an area detection unit 14, and a model generation unit 15.

The imager 11 acquires multiple images I captured at multiple capturing positions. Each image I is an image captured by an imager such as a camera CR (C1, C2, and the like).

The optical surface detection unit 12 detects an optical surface region included in the multiple captured images. In the present embodiment, the optical surface region is, for example, a region in which a surrounding image is reflected therein an image, and includes at least one of a reflective surface region in which a reflected image visually recognized by reflection of light is reflected and a transmissive surface region in which a transmitted visual object visually recognized through a transparent member is reflected. The optical surface detection unit 12 can detect the optical surface region included in an image by a known method. For example, a predetermined pattern is displayed toward a three-dimensional space K by a display device, the pattern is moved in one direction, and the three-dimensional space is captured by the imager in this state. The optical surface detection unit 12 detects whether there is a region in which the movement of the pattern is projected to be reversed or a region in which the movement of the pattern is not uniform in the captured image. When the optical surface detection unit 12 detects the region in which the movement of the pattern is projected to be reversed, the region can be set as the reflective surface region. In addition, in a case where the optical surface detection unit 12 detects the region where the movement of the pattern is not uniform, the region can be set as the transmissive surface region. A specific method by which the optical surface detection unit 12 detects the optical surface region is not limited to the above, and may be another method.

The reflective surface region in the present embodiment includes, for example, a region in which a color of a base member appears to overlap a color of the image reflected on the mirror surface, such as a nonmetallic member whose surface has been subjected to mirror surface treatment or a chromatic metal member such as gold or copper, and a region in which a color of the image reflected on the mirror surface is directly visible, such as an achromatic metal member whose surface has been subjected to mirror surface treatment. Examples of the transmissive surface region in the present embodiment include a surface of a light transmitting member that transmits light, such as a glass plate. The transmissive surface region includes a chromatic light transmitting member, an achromatic light transmitting member, and the like.

The color attribute detection unit 13 detects a color attribute of the optical surface region. The color attribute in the present embodiment includes hue, saturation, and lightness, which are so-called three attributes of color. The color attribute detection unit 13 detects the color attribute in the optical surface region by, for example, image processing. By detecting the color attribute of the optical surface region, a tendency of the color attribute of the optical surface region can be obtained. The color attribute detection unit 13 can detect hue, saturation, and lightness constituting the color attribute of the optical surface region, for example, as numerical values such as coordinates in a color space.

The area detection unit 14 detects an area of the optical surface region. The area detection unit 14 can detect, for example, a number of pixels corresponding to the optical surface region detected in the image I as the area of the optical surface region.

Figure 3:
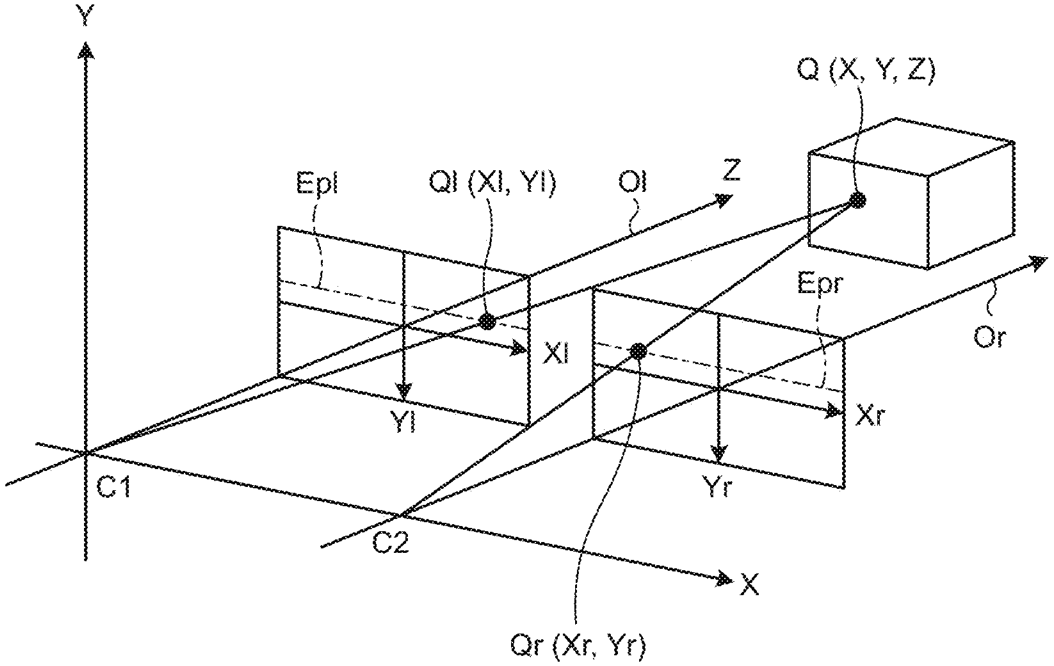
FIG. 3 is an explanatory diagram illustrating a positional relationship between two images to which a principle of photogrammetry is applied.

The model generation unit 15 generates a three-dimensional model based on multiple images captured by the imager 11. The model generation unit 15 can generate the three-dimensional model based on, for example, a principle of photogrammetry. Here, the principle of photogrammetry will be described. Hereinafter, a case where three-dimensional image data is generated from two pieces of image data will be described. FIG. 3 is an explanatory diagram illustrating a positional relationship between two images to which the principle of photogrammetry is applied, and FIG.

4 is an explanatory diagram illustrating the positional relationship between two images.

The model generation unit 15 extracts, for example, two pieces of image data having the same position indicated by the position data. Note that the positions being the same are not limited to being exactly the same, and the positions that are shifted by a predetermined amount may also be regarded as being the same.

First, two-set image data is captured by a camera C1 for a visual field image and a camera C2 for a visual field image (see FIG. 3) with respect to an object. Next, the model generation unit 15 searches for corresponding points of a feature point Q(x, y, z) based on the two-set image data. The model generation unit 15 performs, for example, association for each pixel, and searches for a position where a difference is minimized. Here, as illustrated in FIG. 3, it is assumed that the cameras C1 and C2 that are simultaneously present at two viewpoints are arranged in a relationship of Yl=Yr such that the optical axes Ol and Or are included on the same X-Z coordinate plane. A disparity vector corresponding to the difference in angle for each pixel is calculated using the corresponding point searched by the model generation unit 15.

Since the calculated disparity vector corresponds to the distance from the cameras C1 and C2 in a depth direction, the model generation unit 15 performs a distance calculation in proportion to a magnitude of the disparity by perspective. Assuming that the cameras C1 and C2 of a photographer move only substantially horizontally, the cameras C1 and C2 are arranged such that their optical axes Ol and Or are included on the same X-Z coordinate plane, so that the corresponding points may be searched only on scanning lines which are epipolar lines Epl and Epr. The model generation unit 15 generates three-dimensional image data of the object by using two pieces of image data of the object and respective distances from the cameras C1 and C2 to the object. The model generation unit 15 may store the generated three-dimensional image data in, for example, the storage 20, or may output or transmit the generated three-dimensional image data to an outside from an output unit or a communication unit (not illustrated).

Figure 4:
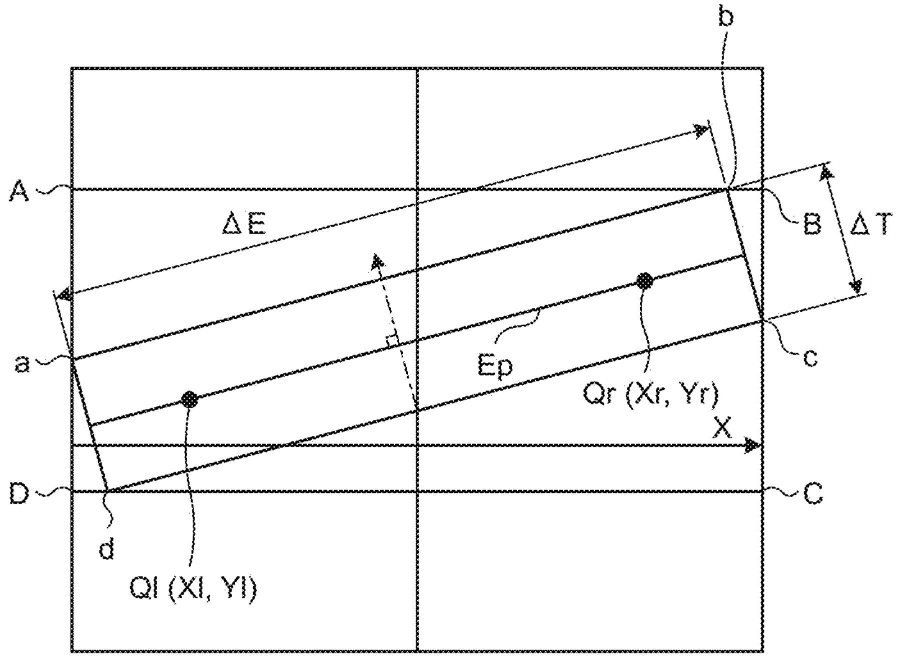
FIG. 4 is an explanatory diagram illustrating a positional relationship between two images.

Meanwhile, when a point Ql(Xl, Yl) on a left image corresponds to a point Qr(Xr, Yr) on a right image, the disparity vector at the point Ql(Xl, Yl) is Vp(Xl−Xr, Yl−Yr). Here, since the two points Ql and Or are on the same scanning line (epipolar line), Yl=Yr, and the disparity vector is expressed as Vp(Xl−Xr, 0). The model generation unit 15 obtains the disparity vector Vp for all the pixel points on the image and creates a disparity vector group to obtain information in the depth direction of the image. Meanwhile, for a set in which the epipolar line is not horizontal, a height of position of one camera may be different (probability is low). In this case, as compared with a case where a corresponding point is searched in a large two-dimensional region by the model generation unit 15 without being conscious of corresponding point matching, a minimum calculation amount of the rectangle is reduced to become reasonable by searching the corresponding point within a rectangle with a width in the epipolar line direction and a vertical width in the orthogonal direction having a degree of deviation from the horizontal. A search range in which the epipolar line direction search range for the minimum rectangle is a to b=c to d and the orthogonal direction search range is b to c=d to a is illustrated in FIG. 4. In this case, the search width in the epipolar line direction is ΔE, and the search width in the direction T orthogonal to the epipolar line is ΔT. A minimum non-inclined rectangle ABCD including a minimum inclined rectangle abcd is obtained.

As described above, the model generation unit 15 obtains the disparity vectors from the corresponding points of the feature points of the multiple cameras C1 and C2 under a epipolar constraint condition, obtains information in the depth direction of each point, and maps texture on the surface of the three-dimensional shape to generate three-dimensional image data. As a result, the model of a portion in the image data used for calculation can reproduce a space viewed from a front hemisphere. In addition, in a case where there is a portion not included in the three-dimensional image data, if lines or surfaces of surrounding textures are extended to be connected, interpolation is performed using the same texture therebetween.

Note that the method for generating three-dimensional image data is not limited to the above-described method, and other methods may be used.

In a case where the optical surface region is included in the multiple images I, the model generation unit 15 arranges a mask covering the optical surface region in the optical surface region, and generates the three-dimensional model based on the multiple images I in which the mask is arranged. The model generation unit 15 can arrange a mask having a color corresponding to the color of the optical surface region in the optical surface region. For example, in a case where a color attribute of the optical surface region detected by the color attribute detection unit 13 has a predetermined tendency, the model generation unit 15 can generate and arrange a mask (hereinafter, referred to as a corresponding mask) having a color attribute corresponding to the color attribute of the optical surface region. Meanwhile, in a case where the color attribute of the optical surface region detected by the color attribute detection unit 13 does not have a predetermined tendency, the model generation unit 15 can arrange a preset mask (hereinafter, it is referred to as a standard mask).

For example, in a case where each value indicating the hue, the saturation, and the lightness of the optical surface region is distributed at a ratio equal to or greater than a threshold value within a predetermined range in the color space, the model generation unit 15 can determine that the color attribute of the optical surface region has a predetermined tendency. In the present embodiment, when the color attribute of the optical surface region has a predetermined tendency, the optical surface region has a chromatic color. When the color attribute of the optical surface region does not have a predetermined tendency, the optical surface region has an achromatic color or is close to a state of an achromatic color.

When generating the corresponding mask for the color attribute of the optical surface region, the model generation unit 15 can set the color attribute of the corresponding mask to, for example, a color attribute corresponding to a peak value in a distribution of values indicating the color attribute of the optical surface region. As a result, since the mask having the color corresponding to the color of the optical surface region is arranged in the optical surface region, discomfort of an observer is reduced. In this case, the model generation unit 15 may attach a display indicating gloss to the corresponding mask, for example. In this case, it is possible to cause the observer to recognize that the region of the corresponding mask is the optical surface region.

In a case where the color attribute of the optical surface region does not have a predetermined tendency, the model generation unit 15 arranges a preset standard mask. In this case, for example, a mask having an appearance imitating a reflective surface of an achromatic mirror or the like can be set as the standard mask.

In addition, when the area of the optical surface region detected by the area detection unit 14 is less than a predetermined value, the model generation unit 15 may arrange a standard mask in the optical surface region regardless of the color attribute of the optical surface region. In a case where the area of the optical surface region is small, it is estimated that the discomfort given to the observer does not increase even when the corresponding mask of the color corresponding to the color of the optical surface region is not arranged. In this case, processing of setting the color attribute and the like of the corresponding mask can be omitted.

Note that the model generation unit 15 may always arrange a standard mask in the optical surface region regardless of the color attribute of the optical surface region.

The storage 20 stores various types of information. The storage 20 stores information about a standard mask set in advance. The storage 20 includes, for example, a storage such as a hard disk drive or a solid state drive. Note that an external storage medium such as a removable disk may be used as the storage 20.

The storage 20 stores a three-dimensional model generation program for causing a computer to execute processing of acquiring multiple images I captured at multiple capturing positions, processing of detecting an optical surface region in which at least one of a reflected image visually recognized by reflection of light and a transmitted visual object visually recognized through a transparent member is reflected among the multiple captured images I, and processing of arranging a mask in the optical surface region and generating a three-dimensional model based on the multiple images in which the mask is arranged.

Figure 5:
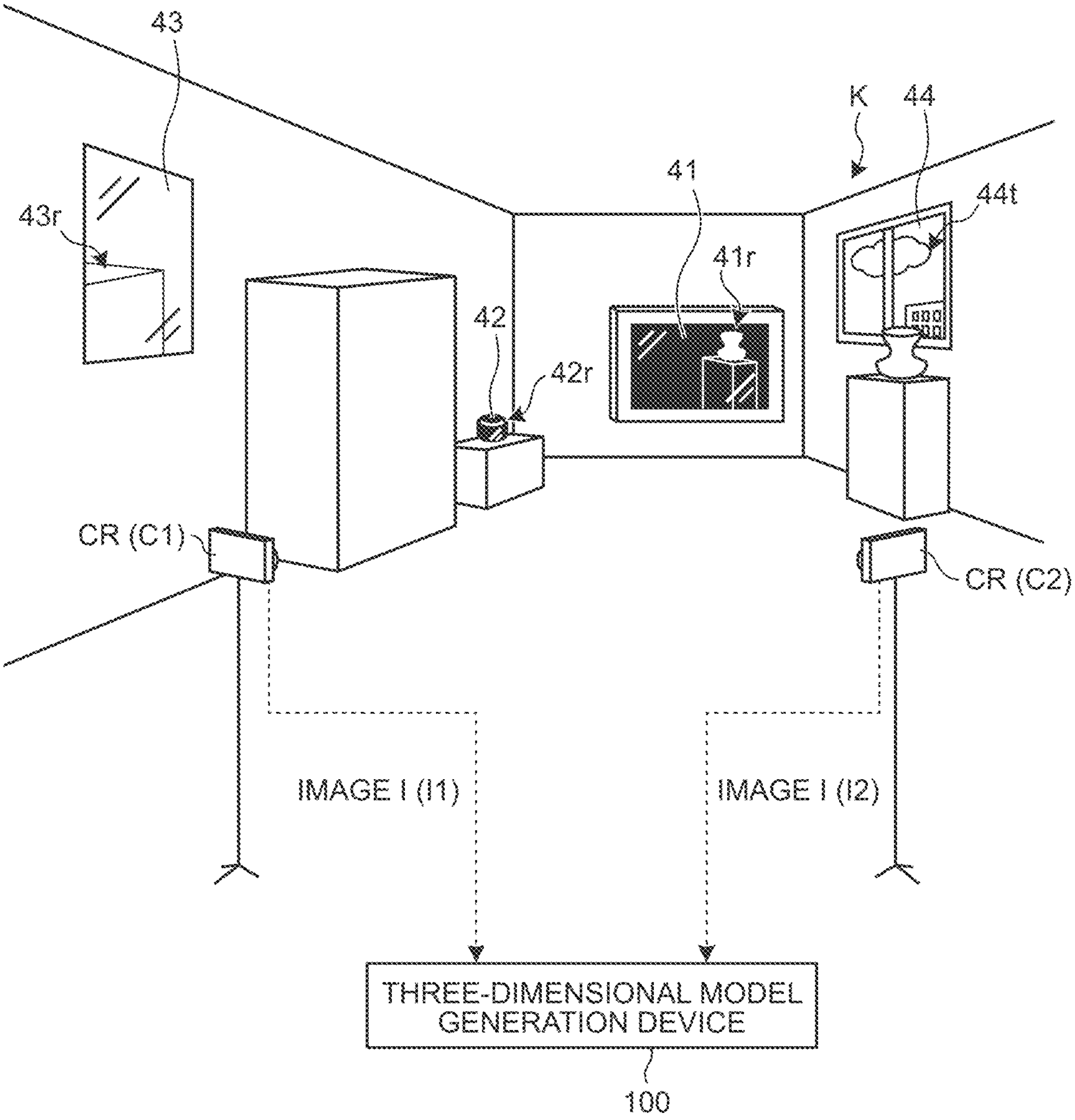
FIG. 5 is a diagram illustrating a state of photographing a three-dimensional space.
Figure 6:
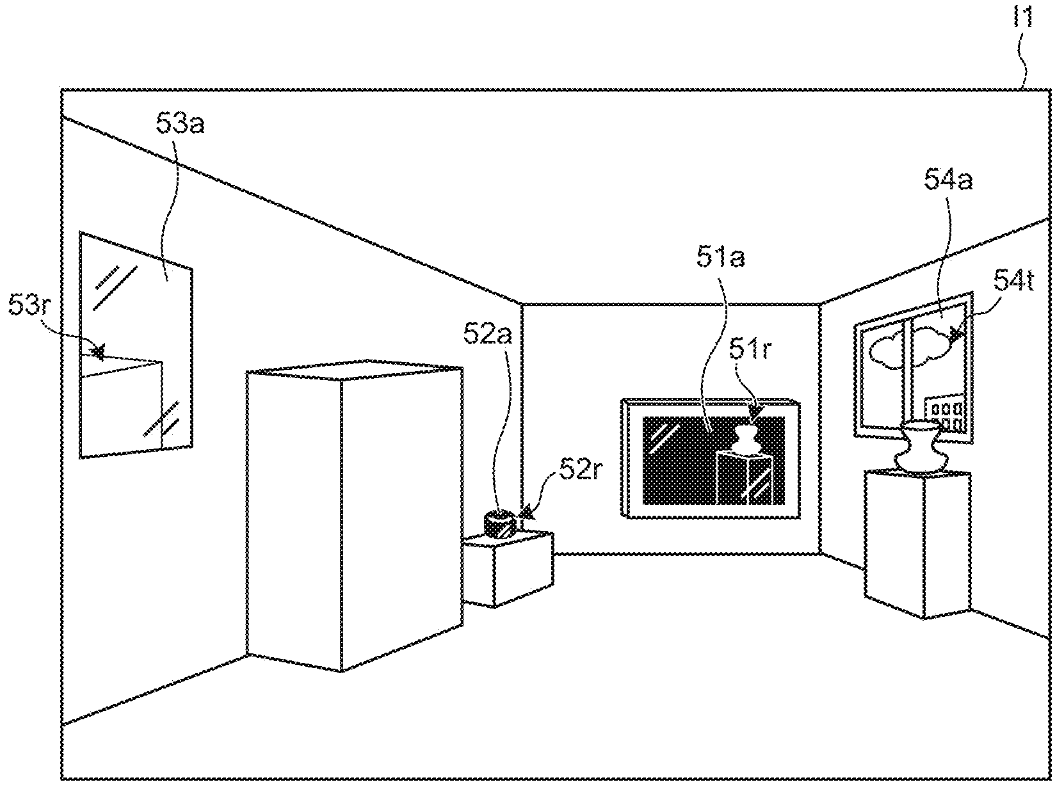
FIG. 6 is a diagram illustrating an example of multiple images obtained by capturing a three-dimensional space.
Figure 6:
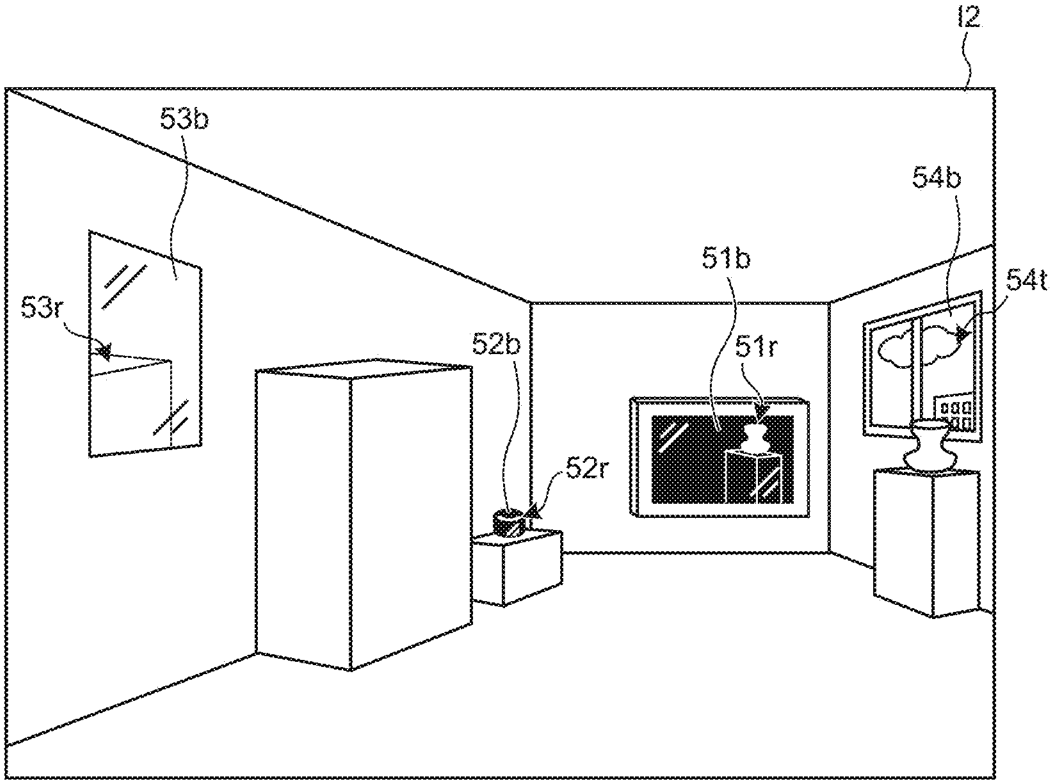
Figure 7:
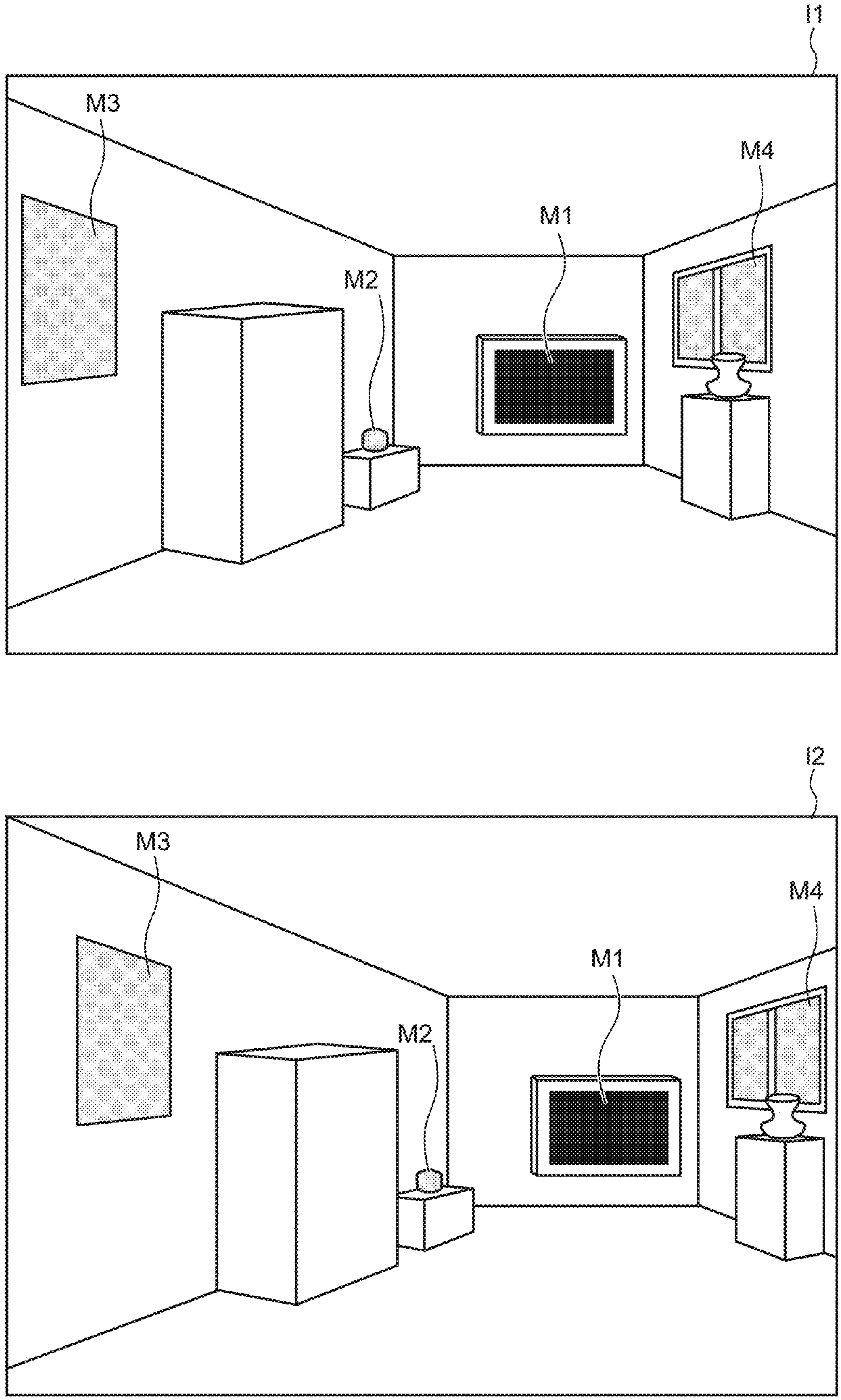
FIG. 7 is a diagram illustrating an example of a state in which masks are arranged in multiple images.

Next, an operation of the three-dimensional model generation device 100 configured as described above will be described. FIG. 5 is a diagram illustrating a state of capturing a three-dimensional space K. FIG. 6 is a diagram illustrating an example of multiple images obtained by capturing the three-dimensional space K. FIG. 7 is a diagram illustrating an example of a state in which masks are arranged in multiple images.

First, as illustrated in FIG. 5, images of the three-dimensional space K is captured at different capturing positions. The imager 11 acquires multiple captured images. Here, a case where two images I1 and I2 are captured as illustrated in FIG. 6 will be described as an example, but the number of images may be three or more. In the three-dimensional space K, for example, objects on which surrounding images are reflected, such as chromatic (for example, black or the like) resin members 41 and 42 constituting home electric devices such as a television or an electronic jar illustrated in FIG. 5, an achromatic metal member 43 constituting a reflective surface of a back surface mirror, and an achromatic and transparent glass member 44 constituting a window, are arranged. For example, reflected images 41*r* and 42*r* are reflected on the resin members 41 and 42. A reflected image 43*r* is reflected on the metal member 43. The reflected image is an image visually recognized by reflection of light. In the glass member 44, a transmitted visual object 44*t* such as a cloud or a building existing on a back side thereof is observed. The transmitted visual object is an object visually recognized through a transparent member such as a glass member.

By capturing the three-dimensional space K, as illustrated in FIG. 6, the resin members 41 and 42, the metal member 43, and the glass member 44 are reflected as optical surface regions 51*a*, 52*a*, 53*a*, and 54*a* in the captured image I1. In the captured image I2, the resin members 41 and 42, the metal member 43, and the glass member 44 are reflected as optical surface regions 51*b*, 52*b*, 53*b*, and 54*b*.

When an optical surface region is included in the multiple acquired images I1 and I2, the optical surface detection unit 12 detects the optical surface region. In the present embodiment, the optical surface detection unit 12 can detect the optical surface regions 51*a*, 52*a*, 53*a*, and 54*a* included in the image I1 and the optical surface regions 51*b*, 52*b*, 53*b*, and 54*b* included in the image I2.

The reflected images 51*r* to 53*r* or the transmitted visual object 54*t* are reflected in the optical surface regions 51*a* to 54*a* and 51*b* to 54*b*, respectively. In a case where the three-dimensional model is generated in this state, there is a case where the three-dimensional model is generated as if the reflected images 41*r* to 43*r* and the transmitted visual object 44*t* exist as actual structures behind the optical surface region, or the three-dimensional model in which a portion corresponding to the optical surface region is broken is generated. Therefore, in the present embodiment, the optical surface region is appropriately processed to generate the three-dimensional model by performing the following processing.

The color attribute detection unit 13 detects color attributes of the optical surface regions 51*a*, 52*a*, 53*a*, and 54*a* included in the image I1 and the optical surface regions 51*b*, 52*b*, 53*b*, and 54*b* included in the image I2. In addition, the area detection unit 14 detects the areas of the optical surface regions 51*a*, 52*a*, 53*a*, and 54*a* included in the image I1 and the optical surface regions 51*b*, 52*b*, 53*b*, and 54*b* included in the image I2.

The model generation unit 15 determines whether the areas of the optical surface regions 51*a*, 52*a*, 53*a*, and 54*a* and the optical surface regions 51*b*, 52*b*, 53*b*, and 54*b* are less than a predetermined value. In the present embodiment, the model generation unit 15 determines that the areas of the optical surface regions 51*a*, 53*a*, and 54*a* of the image I1 and the areas of the optical surface regions 51*b*, 53*b*, and 54*b* of the image I2 are equal to or larger than a predetermined value. In addition, the model generation unit 15 determines that the area of the optical surface region 52*a* of the image I1 and the area of the optical surface region 52*b* of the image I2 are less than the predetermined value. For the optical surface region 52*a* of the image I1 and the optical surface region 52*b* of the image I2 of which the area is determined to be less than the predetermined value, the model generation unit 15 arranges a standard mask M2 as illustrated in FIG. 7 regardless of the color attribute determined below.

The model generation unit 15 determines whether the color attributes of the optical surface regions 51*a*, 53*a*, and 54*a* and the optical surface regions 51*b*, 53*b*, and 54*b* have a predetermined tendency. In the present embodiment, for example, the model generation unit 15 determines that the color attributes of the optical surface region 51*a* of the image I1 and the optical surface region 51*b* of the image I2 have a predetermined tendency. For the optical surface regions 51*a* and 51*b* determined that the color attribute has a predetermined tendency, the model generation unit 15 arranges the corresponding mask M1 corresponding to the color attribute as illustrated in FIG. 7.

For example, the model generation unit 15 determines that the color attributes of the optical surface regions 53*a* and 54*a* of the image I1 and the optical surface regions 53*b* and 54*b* of the image I2 do not have a predetermined tendency. The model generation unit 15 arranges the standard masks M3 and M4 as illustrated in FIG. 7 for the optical surface regions 53*a*, 53*b*, 54*a*, and 54*b* determined that the color attribute does not have the predetermined tendency.

Figure 8:
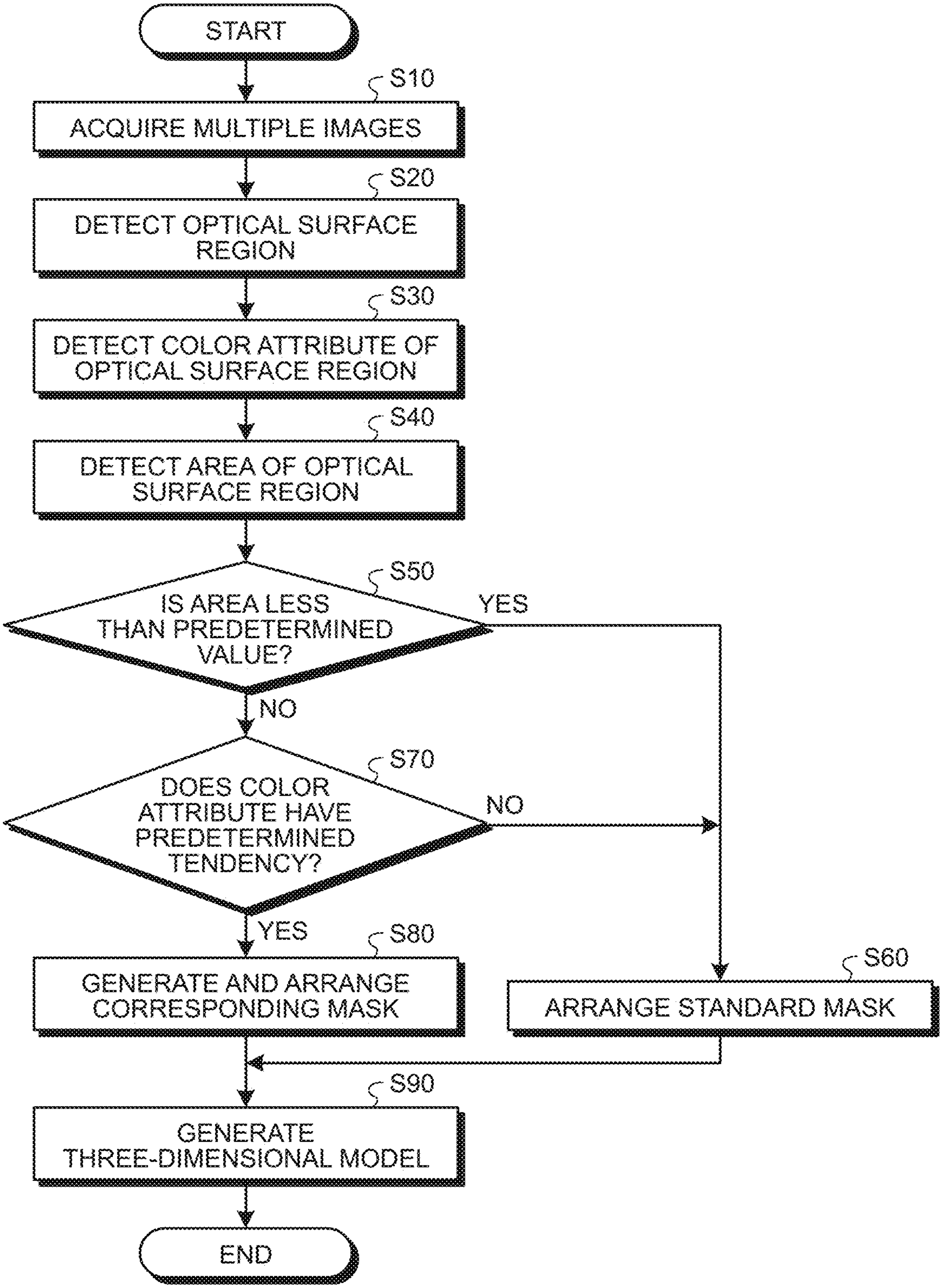
FIG. 8 is a flowchart illustrating an example of a three-dimensional model generation method according to the present embodiment.

FIG. 8 is a flowchart illustrating an example of a three-dimensional model generation method according to the present embodiment. As illustrated in FIG. 8, the imager 11 acquires multiple images by capturing the three-dimensional space K at different capturing positions (Step S10). The optical surface detection unit 12 detects an optical surface region included in the multiple captured images (Step S20). The color attribute detection unit 13 detects the color attribute of the optical surface region (Step S30). The area detection unit 14 detects the area of the optical surface region (Step S40).

The model generation unit 15 determines whether the area of the optical surface region is less than a predetermined value (Step S50). When it is determined that the area of the optical surface region is less than the predetermined value (Yes in Step S50), the model generation unit 15 arranges a standard mask for the optical surface region (Step S60).

When determining that the area of the optical surface region is not less than the predetermined value (No in Step S50), the model generation unit 15 determines whether the color attribute of the optical surface region has a predetermined tendency (Step S70). When determining that the color attribute of the optical surface region has a predetermined tendency (Yes in Step S70), the model generation unit 15 generates a corresponding mask having a color attribute corresponding to the color attribute of the optical surface region and arranges the corresponding mask in the optical surface region (Step S80). Meanwhile, when determining that the color attribute of the optical surface region does not have the predetermined tendency (No in Step S70), the model generation unit 15 arranges the standard mask in the optical surface region (Step S60).

After the mask is arranged in Step S60 or Step S80, a three-dimensional model is generated based on the multiple images in which the mask is arranged (Step S90).

As described above, a three-dimensional model generation device 100 according to the present embodiment includes: the imager 11 configured to acquire multiple images captured at multiple capturing positions; an optical surface detection unit 12 configured to detect an optical surface region in which at least one of a reflected image visually recognized by reflection of light and a transmitted visual object visually recognized through a transparent member is observed in the multiple captured images; a model generation unit 15 configured to arrange a mask in the optical surface region and generate a three-dimensional model based on the multiple images in which the mask is arranged; and a color attribute detection unit 13 configured to detect a color attribute of the optical surface region, wherein the model generation unit 15 is further configured to: generate, in a case in which the color attribute of the optical surface region has a predetermined tendency, the mask having a color attribute corresponding to the color attribute of the optical surface region and arrange the generated mask; arrange, in a case in which the color attribute of the optical surface region does not have a predetermined tendency and the optical surface region is a reflective surface region in which a reflected image visually recognized by reflection of light is observed, the mask corresponding to the reflective surface region; and arrange, in a case in which the color attribute of the optical surface region does not have a predetermined tendency and the optical surface region is a transmissive surface region in which a transmitted visual object visually recognized through a transparent member is observed, the mask corresponding to the transmissive surface region.

Furthermore, a three-dimensional model generation method according to the present embodiment includes: acquiring multiple images captured at multiple capturing positions; detecting an optical surface region in which at least one of a reflected image visually recognized by reflection of light and a transmitted visual object visually recognized through a transparent member is observed in the multiple captured images; arranging a mask in the optical surface region and generating a three-dimensional model based on the multiple images in which the mask is arranged; and detecting a color attribute of the optical surface region, wherein at the arranging and the generating, generating, in a case in which the color attribute of the optical surface region has a predetermined tendency, the mask having a color attribute corresponding to the color attribute of the optical surface region and arranging the generated mask; arranging, in a case in which the color attribute of the optical surface region does not have a predetermined tendency and the optical surface region is a reflective surface region in which a reflected image visually recognized by reflection of light is observed, the mask corresponding to the reflective surface region; and arranging, in a case in which the color attribute of the optical surface region does not have a predetermined tendency and the optical surface region is a transmissive surface region in which a transmitted visual object visually recognized through a transparent member is observed, the mask corresponding to the transmissive surface region.

In addition, a non-transitory storage medium that stores a three-dimensional model generation program according to the present embodiment causes a computer to execute a process comprising: acquiring multiple images captured at multiple capturing positions; detecting an optical surface region in which at least one of a reflected image visually recognized by reflection of light and a transmitted visual object visually recognized through a transparent member is observed in the multiple captured images; arranging a mask in the optical surface region and generating a three-dimensional model based on the multiple images in which the mask is arranged; and detecting a color attribute of the optical surface region, wherein at the arranging and the generating, generating, in a case in which the color attribute of the optical surface region has a predetermined tendency, the mask having a color attribute corresponding to the color attribute of the optical surface region and arranging the generated mask; arranging, in a case in which the color attribute of the optical surface region does not have a predetermined tendency and the optical surface region is a reflective surface region in which a reflected image visually recognized by reflection of light is observed, the mask corresponding to the reflective surface region; and arranging, in a case in which the color attribute of the optical surface region does not have a predetermined tendency and the optical surface region is a transmissive surface region in which a transmitted visual object visually recognized through a transparent member is observed, the mask corresponding to the transmissive surface region.

According to this configuration, the optical surface region included in the multiple images is detected, the mask is arranged, and the three-dimensional model is generated based on the multiple images in which the mask is arranged. Therefore, even when the optical surface region is included in the multiple images, the optical surface region can be appropriately processed to generate the three-dimensional model.

In the three-dimensional model generation device 100 according to the present embodiment, the model generation unit 15 arranges the mask corresponding to the color of the optical surface region in the optical surface region. According to this configuration, the mask corresponding to the color of the optical surface region is arranged for the optical surface region of the chromatic color, so that the discomfort of the observer can be reduced.

The three-dimensional model generation device 100 according to the present embodiment further includes the color attribute detection unit 13 that detects the color attribute of the optical surface region, in which the model generation unit 15 generates and arranges a corresponding mask having a color attribute corresponding to the color attribute of the optical surface region in a case where the color attribute of the optical surface region has a predetermined tendency, and arranges a preset standard mask in a case where the color attribute of the optical surface region does not have a predetermined tendency. According to this configuration, since the corresponding mask and the standard mask can be properly used according to the color attribute of the optical surface region, the discomfort of the observer can be more reliably reduced.

The three-dimensional model generation device 100 according to the present embodiment further includes the area detection unit 14 that detects the area of the optical surface region, and in a case where the area of the optical surface region is less than a predetermined value, a preset standard mask is arranged regardless of the color attribute of the optical surface region. According to this configuration, when the area of the optical surface region is less than the predetermined value, the processing of setting the color attribute and the like of the corresponding mask can be omitted.

The technical scope of the present application is not limited to the above embodiment, and can be appropriately changed without departing from the gist of the present application. For example, in the above embodiment, the case where the model generation unit 15 determines that the color attribute of the optical surface regions 54*a* and 54*b* corresponding to the glass member 44 such as a window glass does not have a predetermined tendency has been described as an example, but the present invention is not limited thereto. The color attribute of the light transmission region such as a window glass may have a predetermined tendency depending on a view (image) on the back side, for example, when a blue sky is seen. In such a case, the model generation unit 15 can determine that the color attributes of the optical surface regions 54*a* and 54*b* have a predetermined tendency.

In the above embodiment, the case where the same standard mask is applied to the reflective surface region and the transmissive surface region has been described as an example, but the present application is not limited thereto. The optical surface detection unit 12 may detect the reflective surface region and the transmissive surface region separately. In this case, the model generation unit 15 may apply one standard mask of the reflective surface region and another standard mask of the transmissive surface region separately.

According to the present application, a three-dimensional model can be generated by appropriately processing optical surfaces included in multiple images.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A three-dimensional model generation device comprising:

imagers configured to acquire multiple images captured at multiple capturing positions;

at least one memory configured to store computer executable instructions; and at least one processor that is configured to execute the computer executable instructions to perform operations, comprising:

detecting an optical surface region in which at least one of a reflected image visually recognized by reflection of light and a transmitted visual object visually recognized through a transparent member is observed in the multiple captured images;

arranging a mask in the optical surface region and generating a three-dimensional model based on the multiple images in which the mask is arranged; and detecting a color attribute of the optical surface region, wherein the arranging further comprises:

generating, in a case in which the color attribute of the optical surface region has a predetermined tendency, the mask having a color attribute corresponding to the color attribute of the optical surface region and arrange the generated mask;

arranging, in a case in which the color attribute of the optical surface region does not have a predetermined tendency and the optical surface region is a reflective surface region in which a reflected image visually recognized by reflection of light is observed, the mask corresponding to the reflective surface region; and arranging, in a case in which the color attribute of the optical surface region does not have a predetermined tendency and the optical surface region is a transmissive surface region in which a transmitted visual object visually recognized through a transparent member is observed, the mask corresponding to the transmissive surface region.

2. The three-dimensional model generation device according to claim 1, wherein the case in which the color attribute of the optical surface region has the predetermined tendency corresponds to a case in which each value indicating hue, saturation, and lightness of the optical surface region is distributed at a ratio equal to or greater than a predetermined value.

3. The three-dimensional model generation device according to claim 1, wherein the mask having a color attribute corresponding to the color attribute of the optical surface region is a mask having a color attribute corresponding to a peak value in a distribution of values indicating the color attribute of the optical surface region.

4. The three-dimensional model generation device according to claim 1, wherein the operations further comprise detecting an area of the optical surface region, wherein the arranging further comprises arranging, when the area of the optical surface region is less than a predetermined value, a preset mask regardless of the color attribute of the optical surface region.

5. A three-dimensional model generation method comprising:

acquiring, by a system comprising at least one processor and at least one memory, multiple images captured by imagers at multiple capturing positions;

detecting, by the system, an optical surface region in which at least one of a reflected image visually recognized by reflection of light and a transmitted visual object visually recognized through a transparent member is observed in the multiple captured images;

arranging, by the system, a mask in the optical surface region and generating a three-dimensional model based on the multiple images in which the mask is arranged; and detecting, by the system, a color attribute of the optical surface region, wherein at the arranging and the generating, generating, in a case in which the color attribute of the optical surface region has a predetermined tendency, the mask having a color attribute corresponding to the color attribute of the optical surface region and arranging the generated mask;

arranging, by the system, in a case in which the color attribute of the optical surface region does not have a predetermined tendency and the optical surface region is a reflective surface region in which a reflected image visually recognized by reflection of light is observed, the mask corresponding to the reflective surface region; and arranging, by the system, in a case in which the color attribute of the optical surface region does not have a predetermined tendency and the optical surface region is a transmissive surface region in which a transmitted visual object visually recognized through a transparent member is observed, the mask corresponding to the transmissive surface region.

6. A non-transitory storage medium that stores a three-dimensional model generation program causing a computer to execute a process comprising:

acquiring multiple images captured at multiple capturing positions;

detecting an optical surface region in which at least one of a reflected image visually recognized by reflection of light and a transmitted visual object visually recognized through a transparent member is observed in the multiple captured images;

arranging a mask in the optical surface region and generating a three-dimensional model based on the multiple images in which the mask is arranged; and detecting a color attribute of the optical surface region, wherein at the arranging and the generating, generating, in a case in which the color attribute of the optical surface region has a predetermined tendency, the mask having a color attribute corresponding to the color attribute of the optical surface region and arranging the generated mask;

arranging, in a case in which the color attribute of the optical surface region does not have a predetermined tendency and the optical surface region is a reflective surface region in which a reflected image visually recognized by reflection of light is observed, the mask corresponding to the reflective surface region; and arranging, in a case in which the color attribute of the optical surface region does not have a predetermined tendency and the optical surface region is a transmissive surface region in which a transmitted visual object visually recognized through a transparent member is observed, the mask corresponding to the transmissive surface region.

* * * * *